United States Patent
Hosaka et al.

(10) Patent No.: US 11,143,131 B2
(45) Date of Patent: Oct. 12, 2021

(54) VEHICLE CONTROL DEVICE

(71) Applicant: HITACHI AUTOMOTIVE SYSTEMS, LTD., Hitachinaka (JP)

(72) Inventors: Tomoyuki Hosaka, Tokyo (JP); Taisuke Sugii, Tokyo (JP); Eiji Ishii, Tokyo (JP); Kazuki Yoshimura, Tokyo (JP); Yoshihiro Sukegawa, Tokyo (JP); Masayuki Saruwatari, Ibaraki (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 44 days.

(21) Appl. No.: 16/481,304

(22) PCT Filed: Feb. 5, 2018

(86) PCT No.: PCT/JP2018/003739
§ 371 (c)(1),
(2) Date: Jul. 26, 2019

(87) PCT Pub. No.: WO2018/155141
PCT Pub. Date: Aug. 30, 2018

(65) Prior Publication Data
US 2021/0131372 A1    May 6, 2021

(30) Foreign Application Priority Data
Feb. 24, 2017   (JP) .............................. JP2017-032817

(51) Int. Cl.
*F02D 41/20* (2006.01)
*F02D 41/40* (2006.01)
(Continued)

(52) U.S. Cl.
CPC .......... *F02D 41/20* (2013.01); *F02D 41/402* (2013.01); *F02D 41/34* (2013.01); *F02D 45/00* (2013.01);
(Continued)

(58) Field of Classification Search
CPC .......... F02D 41/02; F02D 41/04; F02D 41/34; F02D 41/40; F02D 41/402
(Continued)

(56) References Cited

U.S. PATENT DOCUMENTS 4,359,032 A * 11/1982 Ohie .................... F02M 61/205
                                                        123/458
6,336,598 B1 * 1/2002 Touchette ............... F02D 19/10
                                                        239/408
(Continued)

FOREIGN PATENT DOCUMENTS

CN         101501310 A      8/2009
JP         2007-321694 A   12/2007
(Continued)

OTHER PUBLICATIONS

International Search Report with English translation and Written Opinion issued in corresponding application No. PCT/JP2018/003739 dated Jun. 12, 2018.
(Continued)

*Primary Examiner* — John Kwon
*Assistant Examiner* — Johnny H Hoang
(74) *Attorney, Agent, or Firm* — Foley & Lardner LLP

(57) ABSTRACT

An object of the present invention is to provide a control device of an injector capable of suppressing the influence of pressure reduction boiling even if pressure in a combustion chamber is low. In a case where the temperature of fuel injected from a fuel injection valve is within a set high temperature region and the pressure of the combustion chamber is within a set low pressure region, the control device of an in-cylinder direct injection-type injector according to the present invention controls to increase a lift amount of the injector as compared to the case of a low temperature region or a high pressure region.

10 Claims, 9 Drawing Sheets

(51) Int. Cl.
  *F02D 41/34* (2006.01)
  *F02D 45/00* (2006.01)
  *F02D 41/38* (2006.01)
  *F02M 61/10* (2006.01)

(52) U.S. Cl.
  CPC ............... *F02D 2041/2055* (2013.01); *F02D 2041/389* (2013.01); *F02D 2200/0602* (2013.01); *F02D 2200/0608* (2013.01); *F02M 61/10* (2013.01)

(58) Field of Classification Search
  USPC .................... 701/103–105; 123/478–481
  See application file for complete search history.

(56) References Cited

U.S. PATENT DOCUMENTS

| | | | | |
|---|---|---|---|---|
| 6,557,530 | B1* | 5/2003 | Benson | ................... F02D 41/22 123/480 |
| 7,726,282 | B2* | 6/2010 | Ashizawa | ............. F02D 35/025 123/435 |
| 2004/0045533 | A1* | 3/2004 | Sukegawa | ............. F02D 41/003 123/478 |
| 2008/0208437 | A1 | 8/2008 | Natsui | |
| 2009/0133668 | A1 | 5/2009 | Ashizawa | |
| 2011/0251778 | A1 | 10/2011 | Saito | |
| 2018/0252186 | A1* | 9/2018 | Ogata | ..................... F02D 21/08 |

FOREIGN PATENT DOCUMENTS

| | | |
|---|---|---|
| JP | 2008-38740 A | 2/2008 |
| JP | 2008-38814 A | 2/2008 |
| JP | 2008-208813 A | 9/2008 |
| JP | 2010-48181 A | 3/2010 |
| JP | 2011-220244 A | 11/2011 |
| JP | 2012-82766 A | 4/2012 |
| JP | 2014-62493 A | 4/2014 |
| JP | 2017-8869 A | 1/2017 |

OTHER PUBLICATIONS

Office Action issued in corresponding Chinese Patent Application No. 201880007481.5 dated Jun. 2, 2021.

* cited by examiner (a)

(b)

VEHICLE CONTROL DEVICE

TECHNICAL FIELD

The present invention relates to a vehicle control device that controls an injector used in an internal combustion engine such as a gasoline engine.

The present invention relates to a control device.

BACKGROUND ART

In recent years, gasoline engines in automobiles are increasingly required to improve fuel efficiency. As an engine with excellent fuel efficiency, an in-cylinder injection type engine in which fuel is directly injected into a combustion chamber and an air-fuel mixture of the injected fuel and intake air is ignited by a spark plug and exploded is becoming popular. However, since a distance from an injection point to a wall surface is short in the in-cylinder injection type engine, the fuel is likely to adhere to the inside of the combustion chamber, and restraint of particulate matters (PM) generated by incomplete combustion of the fuel adhered to the low temperature wall surface is an problem to be solved. In order to solve this problem, it is necessary to optimize combustion in the combustion chamber.

In addition, in the in-cylinder injection type engine, it is known that in a case where the temperature of the fuel is high and pressure in the combustion chamber is low, a phenomenon called pressure reduction boiling tends to occur and the fuel is rapidly vaporized. There are problems that under pressure reduction boiling, the particle size of spray becomes smaller and the fuel tends to evaporate, while due to the rapid spread of the spray injected from an injection hole, the adhesion of the fuel to a tip of a fuel injection valve (injector) increases and a tumble flow cannot be intensified well due to a decrease in penetration force.

For example, PTL 1 describes a technique of lowering fuel injection pressure to suppress pressure reduction boiling in a case where the measured or estimated temperature of injected fuel exceeds a set upper limit value.

CITATION LIST

Patent Literature

PTL 1: JP 2008-38814 A

SUMMARY OF INVENTION

Technical Problem

The technique disclosed in PTL 1 is intended to suppress pressure reduction boiling by lowering the fuel injection pressure in a case where the temperature of an engine is higher than a predetermined temperature threshold.

However, there is a problem that with the technology disclosed in PTL 1, under a condition that the fuel is in high temperature and the pressure in the combustion chamber is low, even if the fuel injection pressure is low, the pressure reduction boiling occurs and therefore the effect cannot be obtained well.

In view of the above problems, an object of the present invention is to provide a vehicle control device capable of suppressing the influence of the pressure reduction boiling even if fuel is in high temperature and pressure in a combustion chamber is low.

Solution to Problem

In order to solve the above problems, according to the present invention, a vehicle control device that controls an injector that directly injects fuel into a combustion chamber of an internal combustion engine includes a control unit that controls to increase a lift amount of a valve body of the injector in a case where the temperature of the fuel injected from the injector is within a set high temperature region and the pressure of the combustion chamber is within a set low pressure region.

Advantageous Effects of Invention

According to the present invention, the vehicle control device capable of suppressing the influence of pressure reduction boiling is provided.

DESCRIPTION OF EMBODIMENTS

Hereinafter, embodiments according to the present invention will be described.

First Embodiment

A control device of an injector according to a first embodiment of the present invention will be described below with reference to FIGS. 1 and 2.

Figure 1:
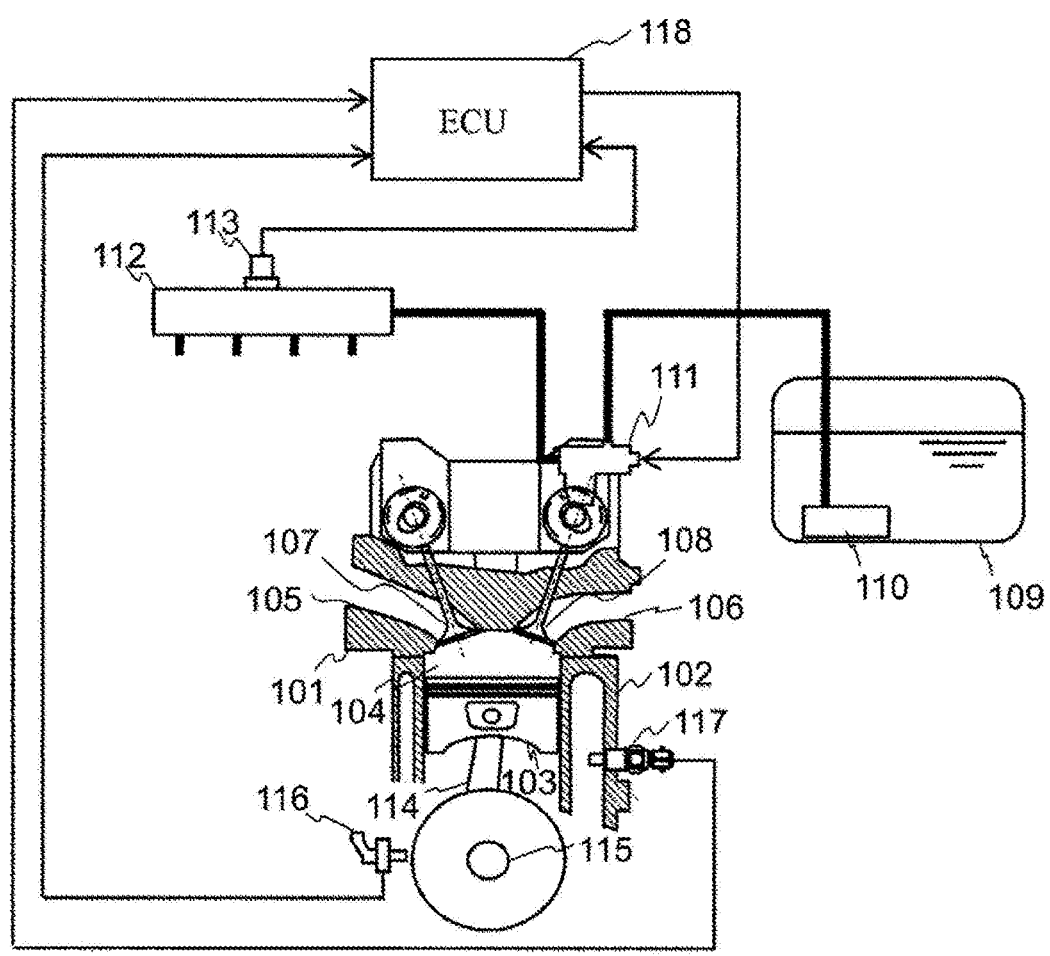
FIG. 1 is a view showing an outline of a configuration of an internal combustion engine according to the present invention.

FIG. 1 is a view showing an outline of a configuration of an in-cylinder injection type engine. The basic operation of the in-cylinder injection type engine will be described with reference to FIG. 1. In FIG. 1, a combustion chamber 104 is formed by a cylinder head 101, a cylinder block 102, and a piston 103 inserted into the cylinder block 102, and an intake pipe 105 and an exhaust pipe 106 are each branched into two and connected toward the combustion chamber 104. An intake valve 107 is provided at the opening of the intake pipe 105, and an exhaust valve 108 is provided at the opening of the exhaust pipe 106, and the intake valve 107 and the exhaust valve 108 operate to open and close in a cam operation method.

The piston 103 is connected to a crankshaft 115 via a connecting rod 114, and a crank angle sensor 116 can detect an engine speed. A value of the engine speed is sent to an engine control unit (ECU) 118. A cell motor (not shown) is connected to the crankshaft 115 and an engine can be started by rotating the crankshaft 115 by the cell motor when the engine is started. The cylinder block 102 is provided with a water temperature sensor 117 and the temperature of engine coolant (not shown) can be detected. The temperature of the engine coolant is sent to the ECU 118.

Although FIG. 1 is description of only one cylinder, a collector (not shown) is provided upstream of the intake pipe 105 and distributes air for each cylinder. An air flow sensor and a throttle valve (not shown) are provided upstream of the collector and an amount of air taken into the combustion chamber 104 can be adjusted by a degree of opening of a throttle valve.

The fuel is stored in a fuel tank 109 and is sent to a high pressure fuel pump 111 by a feed pump 110. The feed pump 110 boosts the fuel to about 0.3 MPa and sends the fuel to the high pressure fuel pump 111. The fuel boosted by the high pressure fuel pump 111 is sent to a common rail 112. The high pressure fuel pump 111 boosts the fuel to about 30 MPa and sends the fuel to the common rail 112. A fuel pressure sensor 113 is provided on the common rail 112 and detects pressure of fuel (fuel pressure). A value of the fuel pressure is sent to the ECU 118.

Figure 2:
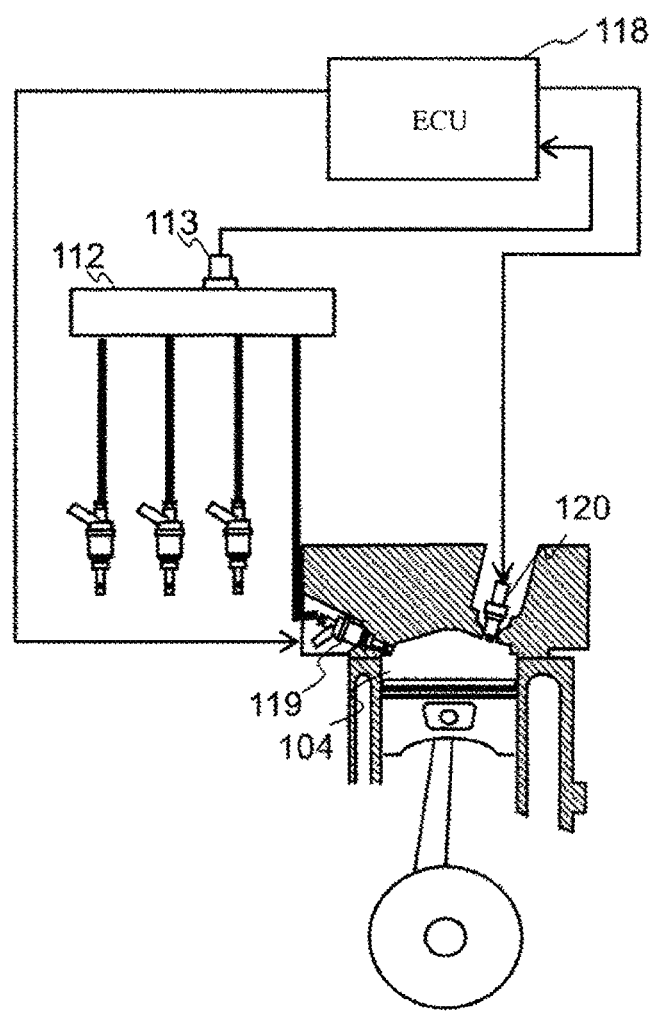
FIG. 2 is a view showing a configuration at a cylinder center cross section of an internal combustion engine according to a first embodiment of the present invention.

FIG. 2 is a view showing a configuration of the in-cylinder injection type engine at a cylinder center cross section. The injector 119 is provided on a radial side surface of the cylinder. A spark plug 120 is provided in the vicinity of the exhaust pipe 106. The ECU 118 can monitor sensor signals and control the operation of devices such as the first injector 119, the spark plug 120, and the high pressure fuel pump 111. In a read only memory (ROM) of the ECU 118, set values of various devices in accordance with a generally used engine speed, water temperature and air-fuel ratio are recorded as map data.

Figure 3:
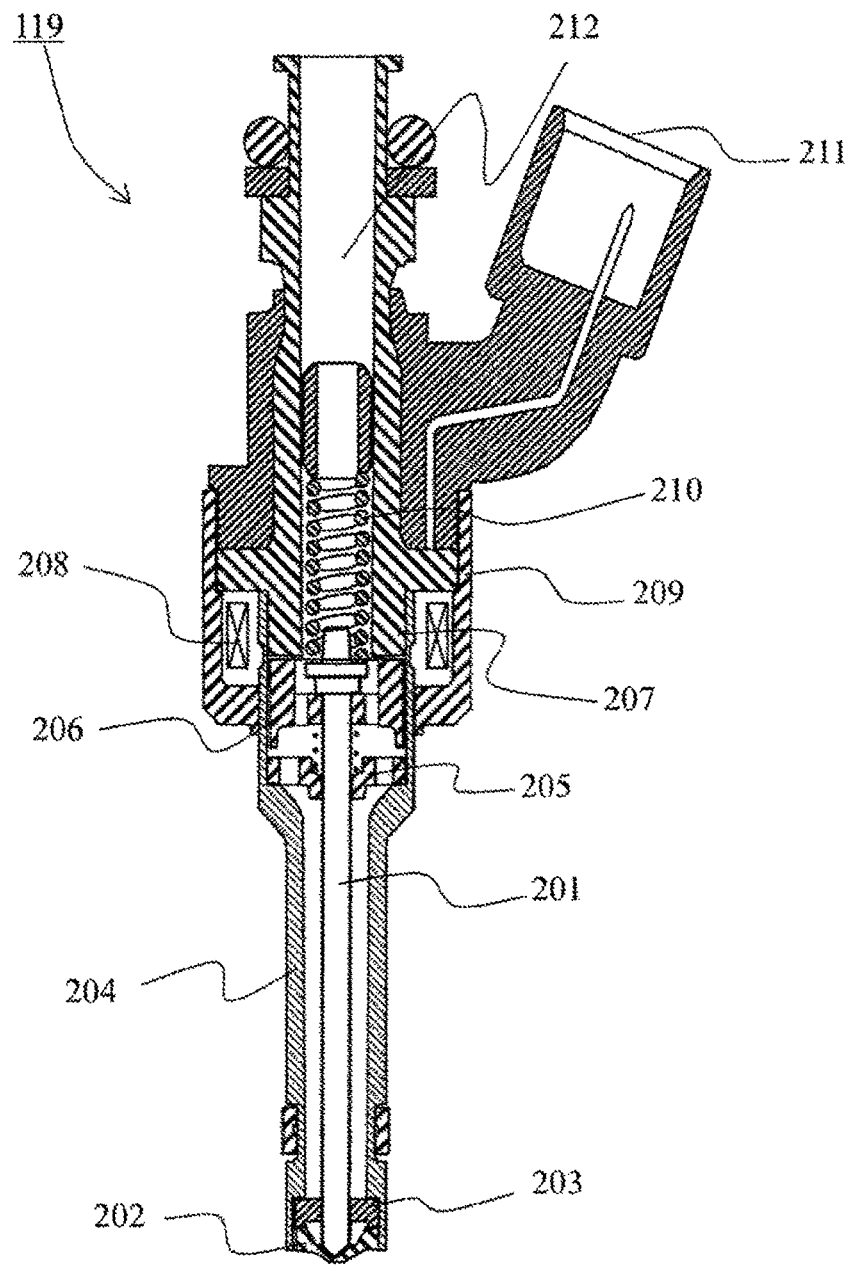
FIG. 3 is a view showing an injector according to the first embodiment of the present invention.

FIG. 3 is a view showing an example of an electromagnetic injector as an example of the injector according to the present invention. The basic operation of the injector will be described using FIG. 3. In FIG. 3, the fuel is supplied from a fuel supply port 212 and is supplied to the inside of the injector. The injector 119 of an electromagnetic type shown in FIG. 3 is of a normally closed electromagnetic drive type, and when a coil 208 is not energized, a valve body 201 is biased by a spring 210 and pressed against a seat member 202 joined to a nozzle body 204 by welding or the like, and the fuel is sealed. At this time, in an injector for in-cylinder injection, pressure of the supplied fuel is in the range of approximately 1 MPa to 50 MPa. When the coil 208 is energized through a connector 211, a magnetic flux density is generated in a core (fixed core) 207, a yoke 209, and an anchor 206 that constitute a magnetic circuit of a solenoid valve, and magnetic attraction force is generated between the core 207 having a void and the anchor 206. When the magnetic attraction force becomes larger than biasing force of the spring 210 and force by the above-described pressure of fuel, the valve body 201 is attracted toward the core 207 side by the anchor 206 while being guided by a guide member 203 and a valve body guide 205 and becomes a valve opening state. In the valve opening state, a gap is generated between the seat member 202 and the valve body 201 and injection of the fuel is started. When injection of the fuel is started, energy given as the pressure of fuel is converted to kinetic energy, reaches a fuel injection hole opened at the lower end portion of the injector, and is injected.

Figure 4:
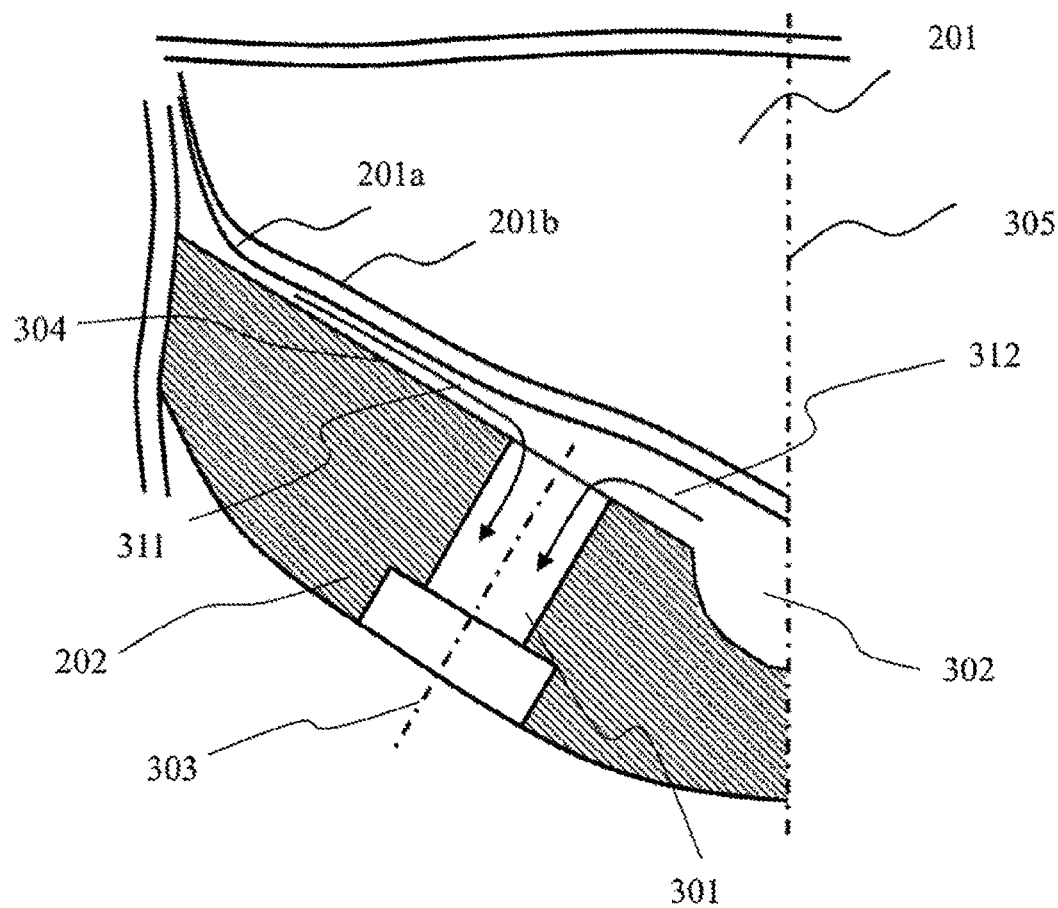
FIG. 4 is an enlarged cross-sectional view of a lower end portion of the injector according to the first embodiment of the present invention.

Next, a detailed shape of the valve body 201 will be described with reference to FIG. 4. FIG. 4 is an enlarged cross-sectional view of a lower end portion of the injector, the cross-sectional view including the seat member 202, the valve body 201, and the like. The seat member 202 includes a valve seat surface 304 and a plurality of injection holes 301 of the fuel. The valve seat surface 304 and the valve body 201 extend axisymmetrically about a valve body central axis 305. The fuel passes through the gap between the seat member 202 and the valve body 201, passes a path of an arrow 311, and is injected from the injection hole 301. A part of the fuel goes around a suck chamber 302 on a tip side of the injection hole and flows into the injection hole from a path of an arrow 312. The valve body can be set to a large lift amount and a small lift amount, and a valve body position in a state of the large lift amount is 201b, and a valve body position in a state of the small lift amount is 201a. The injector 119 in the present embodiment has a two-stage lift function capable of switching a magnitude of the lift amount in accordance with a magnitude of a drive current.

Figure 5:
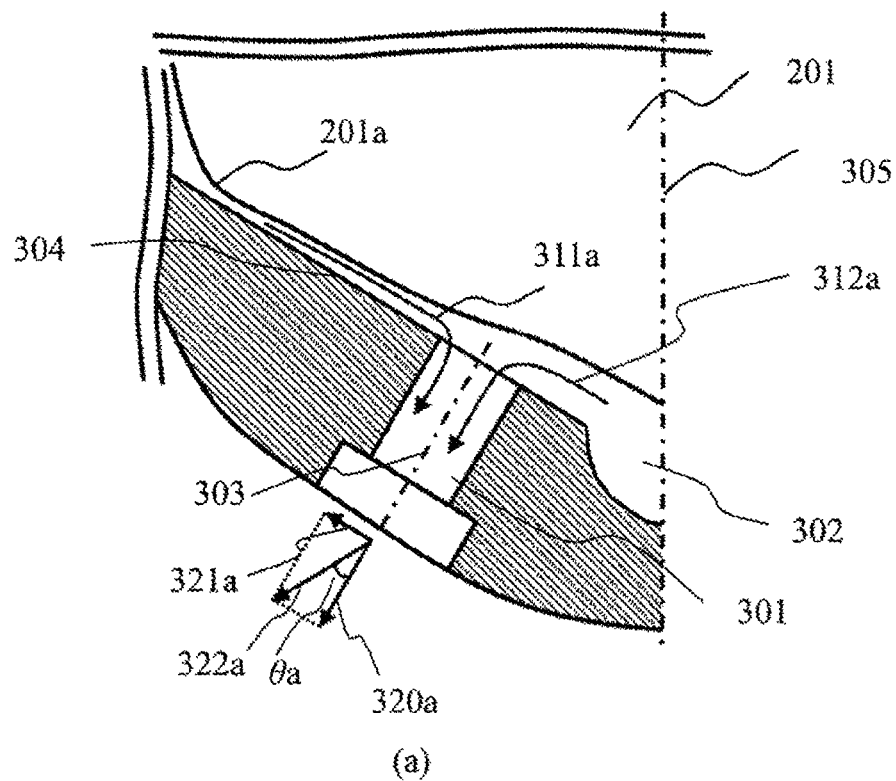
FIG. 5 is views showing relationship between a lift amount of the injector and an injection velocity according to the first embodiment of the present invention.
Figure 5:
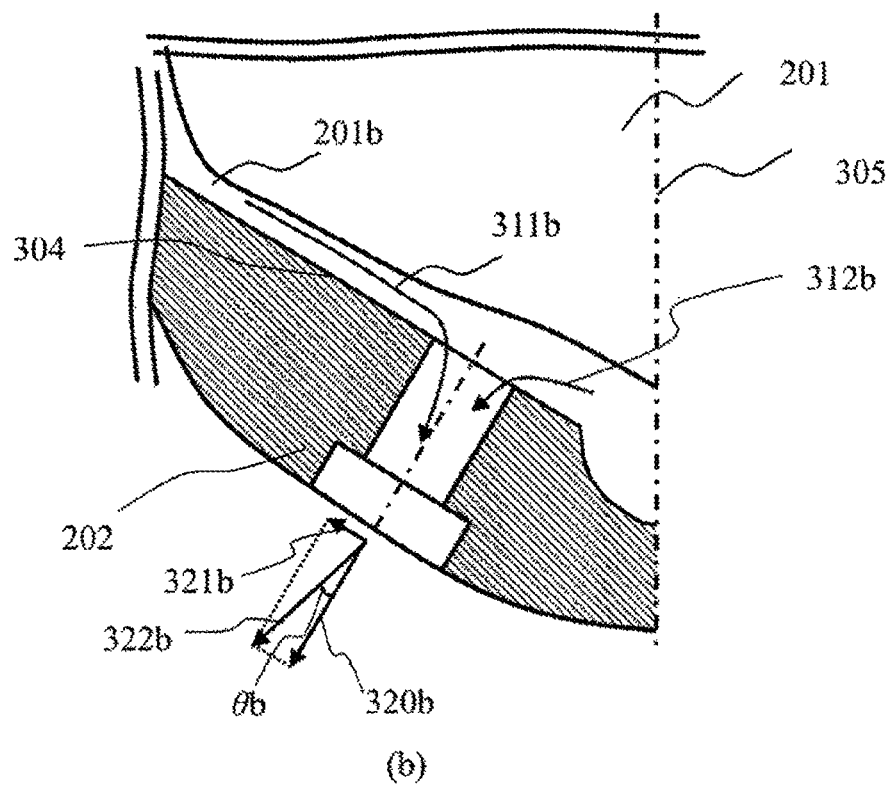

Relationship between the lift amount and a fuel injection velocity will be described with reference to FIG. 5. FIG. 5(a) is an enlarged cross-sectional view in a case where the valve body position of the injector 119 is a small lift position 201a. When the lift amount is small, a distance between the valve body 201 and the valve seat surface 304 becomes short, a cross-sectional area of a flow decreases, whereby a pressure loss in the inflow from a side of the valve seat surface 304 (seat side) increases. As a result, an inflow 311a is weak and an inflow 312a from a side of the suck chamber (suck side) 302 becomes a relatively strong flow. Meanwhile, when the lift amount is large, the pressure loss of the flow from a seat portion side becomes small, an inflow 304b from the seat portion is large, and an inflow 312b from the suck side becomes small.

At this time, a velocity 320b in a direction of an injection hole axis 303 at an outlet of the injection hole in the state of the large lift amount is larger than a velocity 320a in the direction of the injection hole axis 303 at the outlet of the injection hole in the state of the small lift amount. Meanwhile, injection hole outlet velocities 321a and 321b in a direction perpendicular to an axis have a small difference due to the lift amount.

A fuel spray angle θ can be characterized as θ=a tan (axial velocity/surface radial velocity) from an axial average velocity and a surface radial average velocity at the outlet of the injection hole. At this time, from relationship of the velocity 320b>the velocity 320a and relationship of the velocity 321a the velocity 321b, it is clear that an angle θa of the fuel spray in the state of the small lift amount and an angle θb of the fuel spray in the state of the large lift amount is represented by relationship of θa>θb.

Figure 6:
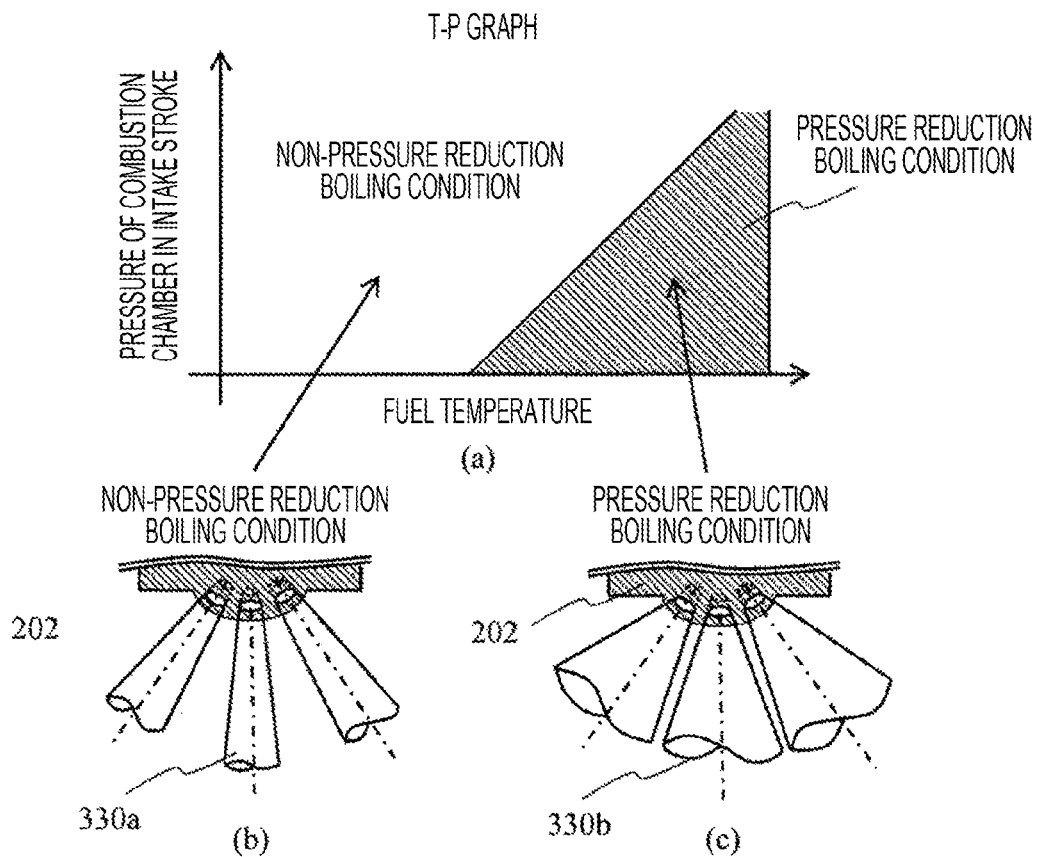
FIG. 6 is a pressure-temperature graph (P-T graph) and views showing pressure reduction boiling conditions and spray according to the first embodiment of the present invention.

Next, changes of a spray angle in the pressure reduction boiling will be described with reference to FIG. 6. FIG. 6(a) is a PT diagram showing conditions of the fuel temperature and the pressure of the combustion chamber under which the pressure reduction boiling occurs. The pressure reduction boiling of the fuel is determined by the fuel temperature and the pressure of the combustion chamber, and a condition of the pressure reduction boiling is a condition that the fuel temperature is high and the pressure of the combustion chamber is low. Under the condition that the fuel temperature is high and the pressure of the combustion chamber is low, the pressure of the fuel becomes lower than the saturated vapor pressure of the fuel and vaporization progresses rapidly, whereby rapid vaporization called the pressure reduction boiling occurs. FIGS. 6(b) and 6(c) are schematic views showing the fuel spray injected from the injector 119 under a condition that the pressure reduction boiling is not occurring and a condition that the pressure reduction boiling is occurring.

In FIG. 6(b), a schematic view of the fuel spray under the condition that the pressure reduction boiling is not occurring is shown at 330a, and in FIG. 6(c), a schematic view of the fuel spray under the condition that the pressure reduction boiling is occurring is shown at 330b. As the condition that the pressure reduction boiling is not occurring, for example, the fuel temperature is 30° C., the pressure of the combustion chamber is 1 bar, and as the condition that the pressure reduction boiling is occurring, for example, the fuel temperature is 80° C. and the pressure of the combustion chamber is 0.7 bar. When the pressure reduction boiling occurs, the turbulence of the fuel spray increases due to rapid evaporation and the size of particles also decreases, whereby the angle of the fuel spray expands. The spread of the angle of the fuel spray increases an amount of fuel adhered to a tip of the injector and this increase becomes a factor for an increase of deposits that cause PM.

Figure 7:
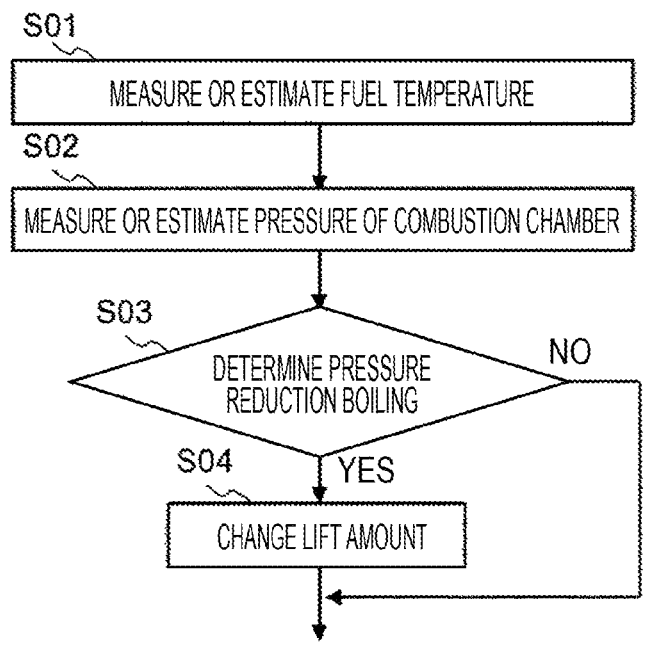
FIG. 7 is a flow chart showing a method of controlling the injector according to the first embodiment of the present invention.

Determination of the pressure reduction boiling and a method of controlling are shown in FIG. 7. The fuel temperature is measured or estimated in control S01 to determine the pressure reduction boiling. The fuel temperature may be measured directly, for example, by disposing a temperature sensor in a fuel passage of the injector 119 or may be estimated on the basis of the outer surface temperature of the injector 119. The outer surface temperature of the injector 119 may be estimated from the temperature of the engine coolant, the engine speed, and a throttle opening degree. Next, in control S02, the pressure in the combustion chamber is measured or estimated. The pressure in the combustion chamber may be directly measured, for example, by disposing a pressure sensor in the combustion chamber or estimated from pressure in an intake port by disposing a pressure sensor in the intake port. Next, in control S03, the pressure reduction boiling is determined on the basis of the fuel temperature and the pressure in the combustion chamber obtained in the control S01 and the control S02. Note that order of the control S01 and the control S02 may be reversed. The P-T graph shown in FIG. 6 is used to determine the pressure reduction boiling. In the present embodiment, saturated vapor pressure curves of normal heptane and isooctane that are the main components of gasoline are used as the P-T graph, or P-T graphs are prepared experimentally for various fuels in advance and the P-T graphs are switched by a known fuel property determination means and used. The prepared P-T graph is held as a two-dimensional map in the ROM of the ECU 118. In a case where it is determined from the P-T graph in the ROM that a pressure reduction boiling condition is satisfied, the lift amount of the valve body 201 of the injector 119 is changed by control S04. In contrast to a case where the pressure reduction boiling condition is not satisfied, in a case where the pressure reduction boiling condition is satisfied, control is performed so that the lift amount becomes large, whereby an injection angle of the fuel spray becomes narrow and the adhesion of the fuel to the tip of the injector can be reduced. At this time, a change of the lift amount may be 20 µm or more.

That is, in a case where the temperature of the fuel injected from the injector is within set high temperature and the pressure of the combustion chamber is within a set region, control is performed to increase the lift amount of the valve body of the injector. More specifically, in the present embodiment, the vehicle control device (ECU 118) that controls the injector 119 that directly injects the fuel into the combustion chamber 104 of the internal combustion engine includes the control unit (CPU) that controls to increase the lift amount of the valve body 201 of the injector 119 in a case where the temperature of the fuel injected from the injector 119 is within the set high temperature region and the pressure of the combustion chamber 104 is within the set low pressure region.

The control unit (CPU) of the vehicle control device (ECU 118) may use the pressure of the intake port to the pressure of the combustion chamber 104 as the pressure of the combustion chamber 104. The control unit (CPU) of the vehicle control device (ECU 118) may use the temperature of the fuel in the pipe (in the common rail 112) disposed upstream of the injector 119 as the temperature of the fuel injected from the injector 119. Alternatively, as described above, the control unit (CPU) may use the surface temperature (outside surface temperature) of the injector 119 as the temperature of the fuel injected from the injector 119.

As a result, the injection angle of the fuel spray is narrowed, and the adhesion of the fuel to the tip of the injector can be reduced. Furthermore, the lift amount is increased, whereby penetration force increase and a tumble flow in the combustion chamber can be suitably intensified.

Second Embodiment

A control device of an injector according to a second embodiment of the present invention will be described with reference to FIG. 8. The injector according to the second embodiment is an injector capable of multistage injection in which the injection is performed multiple times in one cycle, and a maximum lift amount of an injector valve body decreases as the number of multiple stages increases.

In addition, in a case where the number of multiple stages is reduced, control may be performed so that the lift amount of the valve body in multistage injection after the reduction is larger than the lift amount of the valve body before the reduction. However, in the present embodiment, it is not necessarily able to set a plurality of target lift amounts of the injector, and there may be used a configuration in which valve closing is started before valve opening is completely performed, whereby a maximum value of the lift amount is changed. Other configurations are the same as those of the first embodiment.

Figure 8:
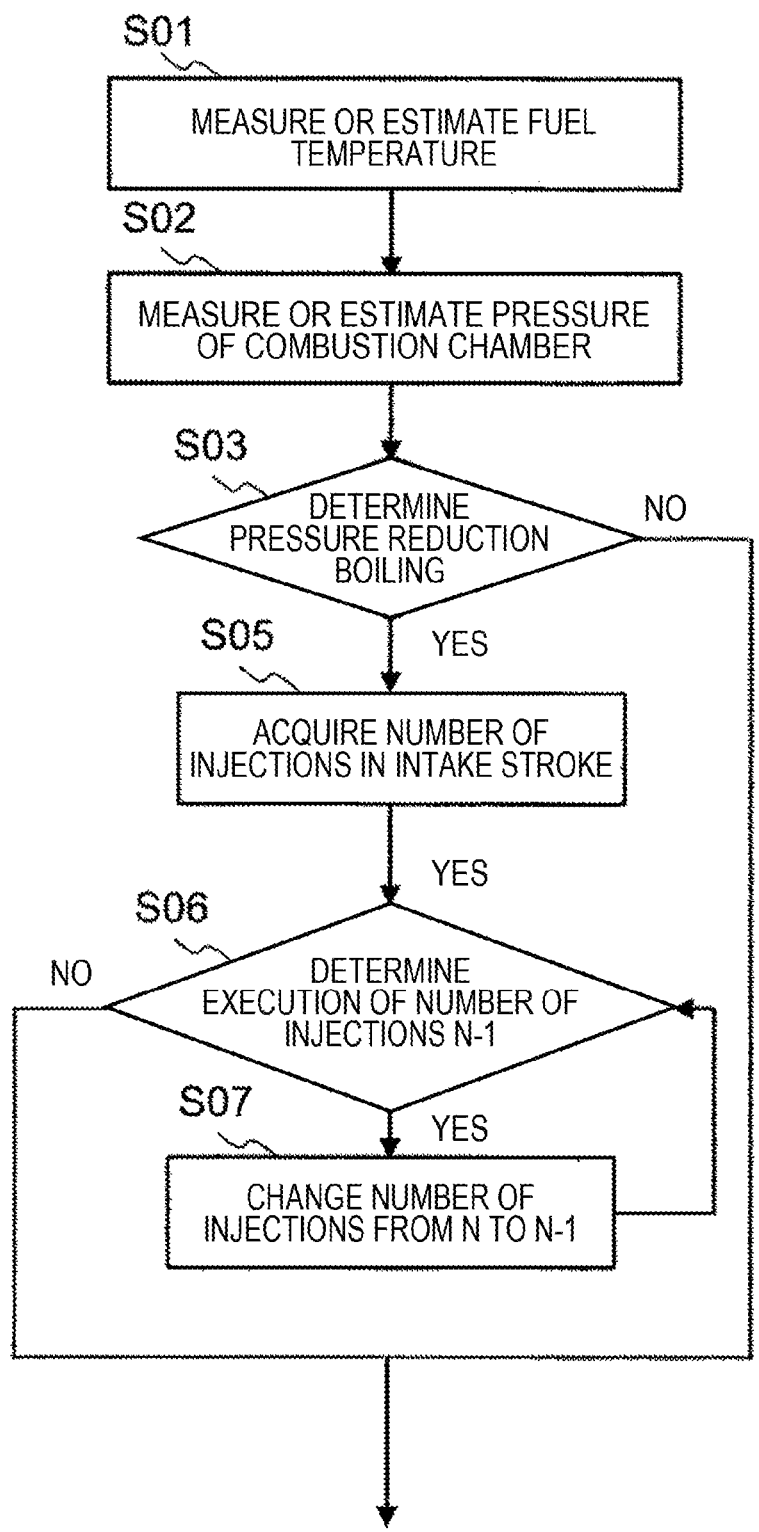
FIG. 8 is a flow chart showing a method of controlling an injector according to a second embodiment of the present invention.

FIG. 8 is a view showing a method of controlling the injector in the second embodiment. In FIG. 8, pressure reduction boiling is determined from a P-T graph recorded in a ROM in control S03. In a case where it is determined that a pressure reduction boiling condition is satisfied, acquires the number of injections in an intake stroke per cycle is acquired in control S05. Next, if the number of injections is two or more, it is determined in control S06 as to whether it is effective to reduce the number of injections in the intake stroke by one. This determination may be made by predicting whether the degree of homogeneity in a cylinder is sufficiently secured when the number of injections is reduced, from an engine speed, a throttle opening degree, an injection amount, and the like.

In a case where execution is affirmed, the number of injections N is changed to N−1, and the process returns to the control S06. In a case where the number of injections becomes 0 or the execution of the number of injections N−1 is denied, the number of injections in the intake stroke is changed to N. At this time, control may be performed to increase an injection amount per injection without changing a total injection amount in the intake stroke or control may be performed to inject, in a compression stroke, an injection amount corresponding to a reduction in the intake stroke without changing the injection amount per injection. The number of injections in the intake stroke is reduced, whereby it is possible to reduce the injection under a condition where the pressure reduction boiling is occurring and reduce the adhesion of the fuel to a tip of the injector. In addition, in a case where the number of injections is reduced and the injection amount per injection is increased, the penetration force of the spray is increased, the adhesion of the fuel to the tip of the injector can be reduced, and a tumble flow can be suitably intensified. In a case where the number of injections is reduced without changing the injection amount per injection, the injection amount under the pressure reduction boiling condition in the intake stroke can be reduced, and the adhesion of the fuel to the tip of the injector can be reduced.

That is, in a case where the temperature of the fuel injected from the injector is within set high temperature and the pressure of the combustion chamber is within a set region, control is performed to reduce the number of multiple stages in one cycle. More specifically, in a case where the temperature of the fuel injected from an injector 119 is within a set high temperature region and the pressure of the combustion chamber 104 is within a set low pressure region, a control unit (CPU) included in a vehicle control device (ECU 118) according to the present embodiment controls to reduce the number of multiple stages in one cycle. Note that in a case where the control unit (CPU) reduces the number of multistage injections in one cycle, it is preferable to control so that the lift amount of the valve body 201 in multistage injection after the reduction is larger than the lift amount of the valve body 201 before the reduction. It is preferable to perform this control in combination with other embodiments.

As a result, the lift amount increases and an axial velocity of the fuel injected from an injection hole of the injector increases, whereby a spray angle can be reduced, and the adhesion of the fuel to the tip of the injector can be reduced. In addition, the penetration force of the spray increases, and the tumble flow can be suitably intensified.

Note that in a case where the pressure reduction boiling condition is no longer satisfied after the number of injections is changed, the number of injections is controlled to be restored to a state before the control is performed.

Third Embodiment

A control device of an injector according to a third embodiment of the present invention will be described with reference to FIGS. 9 and 10. The injector according to the third embodiment is an injector capable of controlling a moving velocity of a valve body of the injector by a current. In the present embodiment, it is not necessarily able to set a plurality of lift amounts of the injector. Other configurations are the same as those of the first embodiment.

Figure 9:
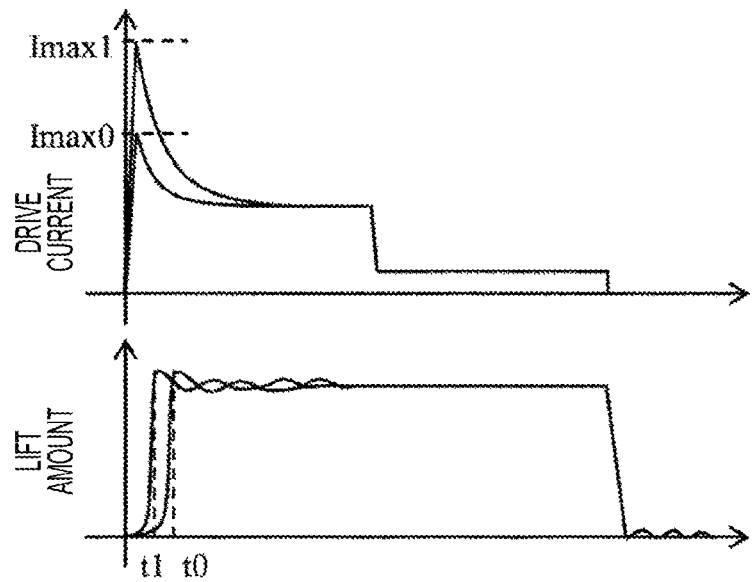
FIG. 9 is a graph showing relationship between a drive current and a lift amount of an injector according to a third embodiment of the present invention.

FIG. 9 is a graph showing relationship between a drive current and the lift amount of the injector in the third embodiment. A valve opening velocity of the injector can be changed by a maximum value Imax of the drive current, and in a case where a drive current Imax0 is set in FIG. 9, if time from start of valve opening of the valve body of the injector until reaching a target lift is represented by t0 and a drive current Imax1 is set, time from when the valve body of the injector starts valve opening until reaching a target lift is represented by t1. In the present embodiment, control is performed to increase a peak value of the drive current to the injector, whereby it is possible to control so that the time from the start of the valve opening of the valve body until reaching the target lift becomes short as compared to before the peak value is increased.

Figure 10:
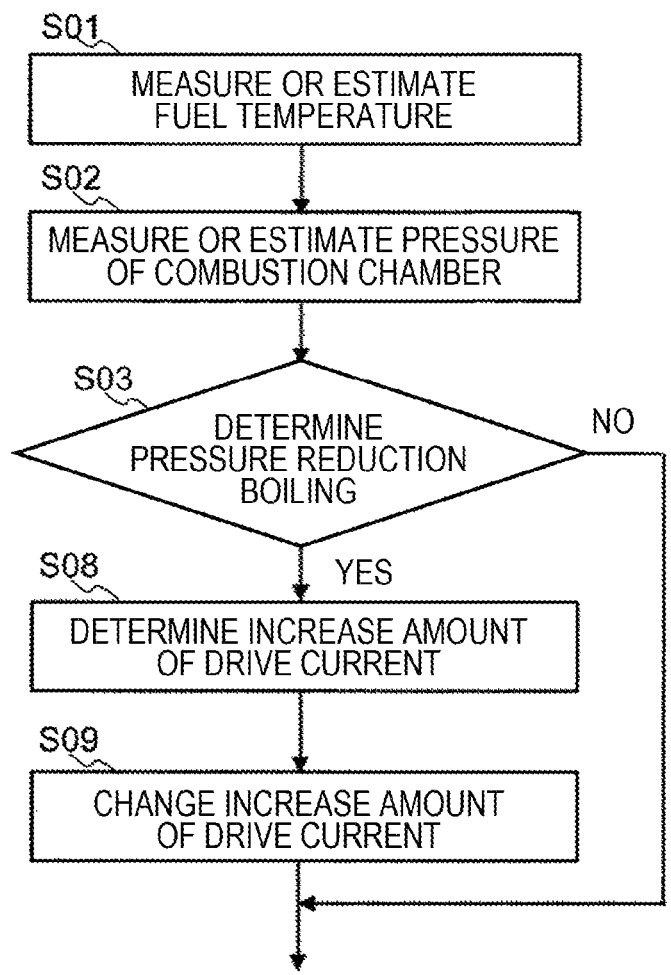
FIG. 10 is a flow chart showing a method of controlling the injector according to the third embodiment of the present invention.

FIG. 10 is a view showing a method of controlling the injector in the third embodiment. In FIG. 10, pressure reduction boiling is determined from a P-T graph recorded in a ROM in control S03 and in a case where it is determined that a pressure reduction boiling condition is satisfied, an increase amount of the drive current is determined in control S0S. By increasing the drive current, time taken for the lift amount to be maximum is reduced, and an axial velocity of fuel injected from an injection hole of the injector increases, whereby a spray angle can be reduced and the adhesion of the fuel to a tip of the injector can be reduced. In addition, the penetration force of the spray increases, and the tumble flow can be suitably intensified.

That is, in a case where the temperature of the fuel injected from the injector is within set high temperature and the pressure of a combustion chamber is within a set region, control is performed to increase a peak value of the drive current to the injector. More specifically, in a case where the temperature of the fuel injected from the injector 119 is within a set high temperature region, and the pressure of the combustion chamber 104 is within a set low pressure region, a control unit (CPU) included in a vehicle control device (ECU 118) according to the present embodiment controls to increase a peak value of the drive current to the injector 119. It is preferable that the control unit (CPU of a microcomputer or the like) included in the vehicle control device (ECU 118) controls to increase the peak value of the drive current to the injector 119, thereby controlling so that the time from the start of the valve opening of the valve body 201 until reaching the target lift becomes short as compared to before the peak value is increased. As a result, the time from the start of the valve opening of the valve body until reaching the target lift becomes short and an injection angle of fuel spray becomes narrow, whereby the adhesion of the fuel to a tip of the injector can be reduced.

In a case where the pressure reduction boiling condition is no longer satisfied after the number of injections is changed, the drive current is controlled to be restored to the state before the control is performed.

Fourth Embodiment

A control device of an injector according to a fourth embodiment of the present invention will be described with reference to FIG. 11. The control device of the injector according to the fourth embodiment is a control device of an injector capable of changing fuel injection pressure (fuel pressure). In the present embodiment, it is not necessarily able to set a plurality of lift amounts of the injector. Other configurations are the same as those of the first embodiment.

Figure 11:
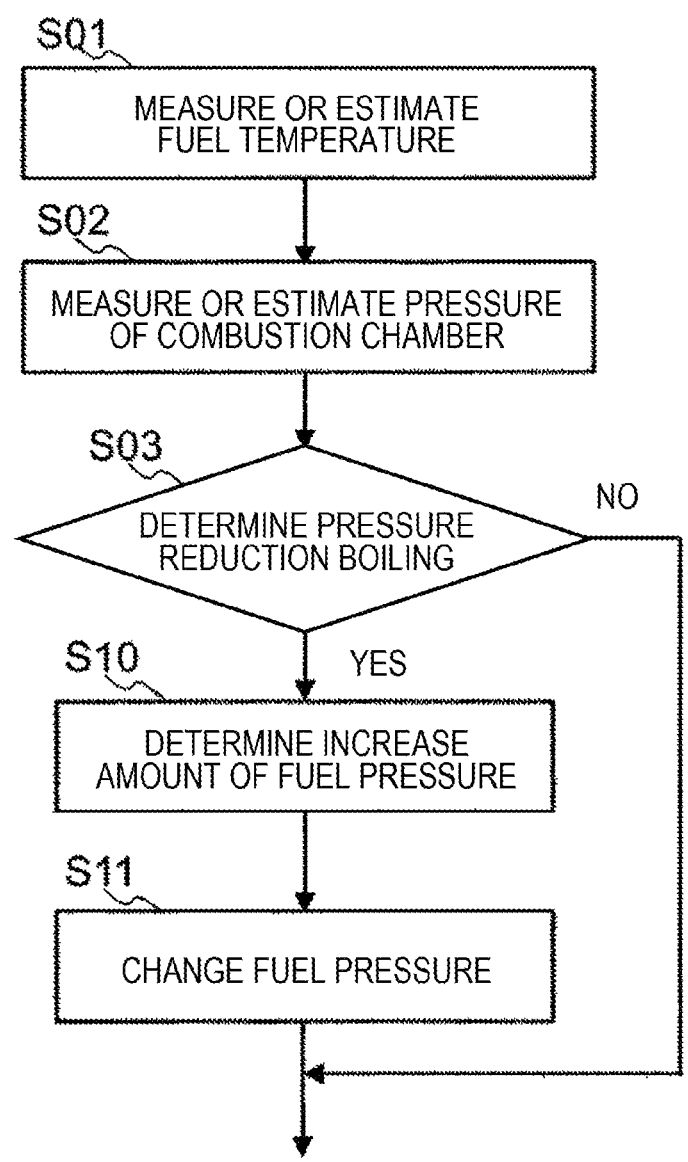
FIG. 11 is a flow chart showing a method of controlling an injector according to a fourth embodiment of the present invention.

FIG. 11 is a view showing a method of controlling the fuel pressure in the fourth embodiment. In FIG. 11, pressure reduction boiling is determined from a P-T graph in FIG. 6 in control S03, and in a case where it is determined that a pressure reduction boiling condition is satisfied, an increase amount of the fuel pressure is determined in control S10. By increasing the fuel pressure, an axial velocity at the time of fuel injection can be increased, whereby a spray angle can be reduced and the adhesion of fuel to a tip of the injector can be reduced.

That is, in a case where the temperature of the fuel injected from the injector is within set high temperature and the pressure of a combustion chamber is within a set region, control is performed to increase the injection pressure of the fuel injected from the injector. More specifically, in a case where the temperature of the fuel injected from the injector 119 is within a set high temperature region and the pressure of a combustion chamber 104 is within a set low pressure region, a control unit (CPU) included in a vehicle control device (ECU 118) according to the present embodiment controls to increase the injection pressure of the fuel injected from the injector 119. As a result, the axial velocity at the time of fuel injection is increased and an injection angle of the fuel spray is narrowed, whereby the adhesion of the fuel to a tip of the injector can be reduced. Furthermore, the fuel pressure is increased, whereby penetration force increases and a tumble flow in the combustion chamber can be suitably intensified.

Note that in a case where the pressure reduction boiling condition is no longer satisfied after the fuel pressure is changed, the fuel pressure is controlled to be restored to a state before the control is performed. The above embodiments can be implemented independently from each other and can be implemented together to obtain the respective functions and effects.

REFERENCE SIGNS LIST

101 cylinder head
102 cylinder block
103 piston
104 combustion chamber
105 intake pipe
106 exhaust pipe
107 intake valve
108 exhaust valve
109 fuel tank
110 feed pump
111 high pressure fuel pump
112 common rail
113 fuel pressure sensor
114 connecting rod
115 crankshaft
116 crank angle sensor
117 water temperature sensor
118 ECU
119 injector
120 spark plug
201 valve body
201*a* valve body position in low lift state
201*b* valve body position in high lift state
202 seat member
203 guide member
204 nozzle body
205 valve body guide
206 anchor
207 core
208 coil
209 yoke
210 spring
211 connector
212 fuel supply port
301 injection hole
302 suck room
303 injection hole central axis
304 valve seat surface
305 valve body central axis
311 inflow from seat portion side
312 inflow from suck room side
320 axial velocity at outlet of injection hole
321 injection hole surface-direction velocity at outlet of injection hole
322 injection-direction velocity at outlet of injection hole
330 fuel spray

The invention claimed is:

1. A vehicle control device that controls an injector that directly injects fuel into a combustion chamber of an internal combustion engine, the vehicle control device comprising:
a control unit configured to increase a lift amount of a valve body of the injector in a case where a temperature of the fuel injected from the injector is within a set high temperature region and a pressure of the combustion chamber is within a set low pressure region,
wherein a temperature sensor is configured to determine the temperature of the fuel injected from the injector, and the determined temperature of the fuel injected from the injector is sent to the control unit, and
wherein a pressure sensor is disposed in an intake port to the combustion chamber and is configured to measure a pressure of the intake port, and the measured pressure of the intake port is sent to the control unit in order to estimate the pressure of the combustion chamber.

2. A vehicle control device that controls an injector capable of multistage injections that directly injects fuel into a combustion chamber of an internal combustion engine, the vehicle control device comprising:
a control unit configured to reduce the number of multistage injections in one cycle in a case where a temperature of the fuel injected from the injector is within a set high temperature region and a pressure of the combustion chamber is within a set low pressure region,
wherein a temperature sensor is configured to determine the temperature of the fuel injected from the injector, and the determined temperature of the fuel injected from the injector is sent to the control unit, and
wherein a pressure sensor is disposed in an intake port to the combustion chamber and is configured to measure a pressure of the intake port, and the measured pressure of the intake port is sent to the control unit in order to estimate the pressure of the combustion chamber.

3. A vehicle control device that controls an injector that directly injects fuel into a combustion chamber of an internal combustion engine, the vehicle control device comprising:
a control unit configured to increase a peak value of a drive current to the injector in a case where a temperature of the fuel injected from the injector is within a set high temperature region and a pressure of the combustion chamber is within a set low pressure region,
wherein a temperature sensor is configured to determine the temperature of the fuel injected from the injector, and the determined temperature of the fuel injected from the injector is sent to the control unit, and
wherein a pressure sensor is disposed in an intake port to the combustion chamber and is configured to measure a pressure of the intake port, and the measured pressure of the intake port is sent to the control unit in order to estimate the pressure of the combustion chamber.

4. The vehicle control device according to claim 1, wherein the injector includes a two-stage lift mechanism capable of switching a magnitude of the lift amount in accordance with a magnitude of a drive current.

5. The vehicle control device according to claim 1, wherein the injector is capable of multistage injections in which fuel injection is performed multiple times in one cycle, and
wherein the control unit is further configured to reduce the number of multistage injections in one cycle such that the lift amount of the valve body in multistage injection is larger after the reduction than the lift amount of the valve body before the reduction.

6. The vehicle control device according to claim 1, wherein the control unit is further configured to increase a peak value of a drive current to the injector, such that a period of time between when the valve body starts to open until the valve body reaches a target lift amount is less than the period of time between when the valve body starts to open until the valve body reaches the target lift amount before the peak value is increased.

7. The vehicle control device according to claim 1, wherein the temperature sensor is disposed in an a pipe upstream of the injector, the temperature sensor configured to measure a temperature of the fuel in the pipe, and
wherein the control unit uses the temperature of the fuel in the pipe measured by the temperature sensor to estimate the temperature of the fuel injected from the injector.

8. The vehicle control device according to claim 1, wherein the temperature sensor is configured to determine a temperature of an outer surface of the injector, and
wherein the control unit uses the temperature of the outer surface of the injector determined by the temperature sensor to estimate the temperature of the fuel injected from the injector.

9. The vehicle control device according to claim 1, wherein the control unit is further configured to increase an injection pressure of the fuel injected from the injector.

10. The vehicle control device according to claim 1, wherein the temperature sensor is disposed in a fuel passage of the injector.

* * * * *